(12) United States Patent
Tsunoda et al.

(10) Patent No.: US 7,235,591 B2
(45) Date of Patent: Jun. 26, 2007

(54) UV-CURABLE COATING COMPOSITION AND COATED ARTICLES

(75) Inventors: Takeshi Tsunoda, Yokohama (JP); Shinji Mitsumune, Fujisawa (JP)

(73) Assignee: BASF Coatings Japan Ltd., Kanagawa (JP)

( * ) Notice: Subject to any disclaimer, the term of this patent is extended or adjusted under 35 U.S.C. 154(b) by 261 days.

(21) Appl. No.: 10/508,326

(22) PCT Filed: Mar. 20, 2003

(86) PCT No.: PCT/JP03/03438

§ 371 (c)(1),
(2), (4) Date: Sep. 20, 2004

(87) PCT Pub. No.: WO03/080745

PCT Pub. Date: Oct. 2, 2003

(65) Prior Publication Data

US 2005/0165125 A1    Jul. 28, 2005

(30) Foreign Application Priority Data

Mar. 22, 2002  (JP)  ............... 2002-080289
May 29, 2002  (JP)  ............... 2002-155717
Oct. 31, 2002  (JP)  ............... 2002-318723

(51) Int. Cl.
*C08F 2/46* (2006.01)
*C08F 2/50* (2006.01)

(52) U.S. Cl. ............. 522/107; 522/104; 522/108; 522/106; 522/113; 522/116; 522/134; 522/139; 522/140; 522/153; 522/154; 522/162; 522/166; 522/167; 522/168; 522/182; 522/183

(58) Field of Classification Search .......... 522/104, 522/108, 106, 113, 116, 134, 139, 140, 153, 522/154, 162, 166, 167, 168, 182, 183
See application file for complete search history.

(56) References Cited

U.S. PATENT DOCUMENTS 5,082,922 A * 1/1992 Brandenburger et al. ... 528/323

FOREIGN PATENT DOCUMENTS

| EP | 247563 A2 | 12/1987 |
|---|---|---|
| JP | 64-11169 A | 1/1989 |
| JP | 8-165399 A | 6/1996 |
| JP | 8-311398 A | 11/1996 |
| JP | 2000-234069 A | 8/2000 |
| JP | 2002-80781 A | 3/2002 |
| WO | 95/20003 A1 | 7/1995 |
| WO | 00/32666 A1 | 6/2000 |

* cited by examiner

*Primary Examiner*—Sanza L. McClendon
(74) *Attorney, Agent, or Firm*—Levy & Grandinetti

(57) ABSTRACT

The present invention relates to an ultraviolet-curable coating composition comprising:
(A) an ultraviolet curable four or more functional groups-containing polyfunctional (meth)acrylate having four or more (meth)acryloyl groups in the molecule and a number average molecular weight of 300 to 2,000,
(B) a lactone-modified polymer of polyhydric alcohol mono (meth)acrylate containing 20 to 60 percents by weight of $\epsilon$-caprolactone ring-opening addition product and having a hydroxyl value derived from the lactone modification of 100 to 180 mgKOH/g, and/or a lactone-modified polyester resin containing 10 to 50 percents by weight of lactone ring-opening addition product and having a hydroxyl value of 50 to 180 mgKOH/g,
(C) a non-yellow polyisocyanate compound and/or an amino resin,
(D) a light stabilizer and,
(E) a photopolymerization initiator,
wherein a weight ratio of component (A) against to a total weight of component Components (B) and (C) is 10:90 to 50:50, a weight ratio of component (B) against to component (C) is 90:10 to 20:80, and the components described above are formulated to obtain a cured paint film having a Knoop hardness of 10 to 18 and a molecular weight of inter-crosslinking of crosslinked resin component in the cured paint film of 150 to 300.

The ultraviolet-curable coating composition of the present invention can form the cured paint film having excellent scratch resistance, aesthetic decorative property, adhesion and gasoline resistance, and has high productivity of paint film.

10 Claims, No Drawings

UV-CURABLE COATING COMPOSITION AND COATED ARTICLES

This application is the U.S. National Phase of PCT Application Number PCT/JP03/03438, filed on 20 Mar. 2003, which claims priority to JP Application Number 2002-318723, filed 31 Oct. 2002, which claims priority to JP Application Number 2002-155717, filed 29 May 2002, which claims priority to JP Application Number 2002-80289, filed 22 Mar. 2002.

FIELD OF TECHNOLOGY

The present invention relates to an ultraviolet-curable coating composition which can be used in the field where a high degree of aesthetic decorative property and excellent properties of a paint film, for example, scratch resistance, gasoline resistance and excellent gloss-holding property in atmospheric exposure are required, and a coated article thereof.

BACKGROUND TECHNOLOGY

In recent years, as coating compositions for vehicles which requires high degree of aesthetic decorative property and board excellent properties of a paint film, solvent type or water-soluble type of acrylic resin/melamine resin coating compositions and acrylic resin/urethane resin coating compositions have been mainly utilized.

Also, as different coating compositions from the thermosetting coating compositions described above, Japanese patent publication 1960210 discloses an ultraviolet-curable coating composition comprising an ultraviolet curable polyfunctional (meth)acrylate and acrylic resin, polyisocyanate compound, light stabilizer and photopolymerization initiator. And Japanese patent publication 2504061 discloses an ultraviolet-curable coating composition comprising an ultraviolet curable polyfunctional (meth)acrylate and acrylic resin, melamine resin or urea resin, light stabilizer and photopolymerization initiator.

However, the acrylic resin/urethane resin coating compositions and the acrylic resin/melamine resin coating compositions described before are not necessarily sufficient in distinction of image of the paint film and are insufficient in view of productivity of the paint film because it takes long time to cure the coating composition. On the other hand, the ultraviolet-curable coating compositions of Japanese patent publication 1960210 and 2504061 give excellent distinction of image of the paint film and have high level productivity of the paint film, but can not give the paint film having excellent scratch resistance.

The present invention has an object to provide the ultraviolet-curable coating composition which can give the paint film having not only excellent scratch resistance and high degree of aesthetic decorative property, but also excellent adhesion and excellent gasoline resistance, and have high level productivity of the paint film, and the coated article obtained by application of the ultraviolet-curable coating composition.

DISCLOSURE OF THE INVENTION

As a result of extensive investigations undertaken by the present inventors in order to solve the problems described above, it was found that the object of the present invention is achieved by using an ultraviolet-curable coating composition comprising a specific ultraviolet curable four or more functional groups-containing polyfunctional (meth)acrylate, a specific lactone-modified polymer of polyhydric alcohol mono(meth)acrylate containing 20 to 60 percents by weight of ε-caprolactone ring-opening addition product and/or a specific lactone-modified polyester resin containing 10 to 50 percents by weight of lactone ring-opening addition product, and a non-yellowing polyisocyanate compound and/or an amino resin, in a specific ratio and further, a light stabilizer and a photopolymerization initiator, and the components described above are formulated to obtain a cured paint film having a Knoop hardness of 10 to 18 and a molecular weight of intercrosslinking of crosslinked resin component in the cured paint film of 150 to 300. And thus the present invention is completed.

That is to say, the present invention provides an ultraviolet-curable coating composition comprising:

(A) an ultraviolet curable four or more functional groups-containing polyfunctional (meth)acrylate having four or more (meth)acryloyl groups in the molecule and a number average molecular weight of 300 to 2,000, (B) a lactone-modified polymer of polyhydric alcohol mono(meth)acrylate containing 20 to 60 percents by weight of ε-caprolactone ring-opening addition product and having a hydroxyl value derived from the lactone modification of 100 to 180 mgKOH/g, and/or a lactone-modified polyester resin containing 10 to 50 percents by weight of lactone ring-opening addition product and having a hydroxyl value of 50 to 180 mgKOH/g, (C) a non-yellowing polyisocyanate compound and/or an amino resin, (D) a light stabilizer and, (E) a photopolymerization initiator, wherein the weight ratio of component (A) to the total weight of components (B) and (C) is 10:90 to 50:50, the weight ratio of component (B) to component (C) is 90:10 to 20:80, and the components described above are formulated to obtain a cured paint film having a Knoop hardness of 10 to 18 and a molecular weight of intercrosslinking of crosslinked resin component in the cured paint film of 150 to 300.

The present invention provides the ultraviolet-curable coating composition as described above, wherein ingredient (B) is a lactone-modified polymer of polyhydric alcohol mono(meth)acrylate containing 20 to 60 percents by weight of ε-caprolactone ring-opening addition product and having a hydroxyl value derived from the lactone modification of 100 to 180 mgKOH/g.

The present invention provides the ultraviolet-curable coating composition as described above, wherein ingredient (B) is a lactone-modified polyester resin containing 10 to 50 percents by weight of lactone ring-opening addition product and having a hydroxyl value of 50 to 180 mgKOH/g.

The present invention provides the ultraviolet-curable coating composition as described above, wherein ingredient (C) is a non-yellowing polyisocyanate compound and the equivalent value of isocyanate group of ingredient (C) to the hydroxyl group of ingredient (B) is from 0.5 to 1.5.

The present invention provides the ultraviolet-curable coating composition as described above, wherein ingredient (C) is an amino resin.

The present invention also provides a coated article obtained by applying the ultraviolet-curable coating composition as described above.

In the present invention, the term, (meth)acryloyl group means acryloyl group and/or methacryloyl group. Also, the term, (meth)acrylate means acrylate and/or methacrylate and the term, (meth)acrylic acid means acrylic acid and/or methacrylic acid.

PREFERABLE EMBODIMENT FOR PRACTICING THE INVENTION

The ultraviolet curable four or more functional groups-containing polyfunctional (meth)acrylate of ingredient (A), used in the present invention, has four or more (meth)acryloyl groups in the molecule. When a polyfunctional (meth)acrylate having two (meth)acryloyl groups in the molecule is used, curability is insufficient and gasoline resistance is inferior. Also, when a polyfunctional (meth)acrylate having three (meth)acryloyl groups in the molecule is used and a large amount of ingredient (A) is formulated to obtain a cured paint film having a molecular weight of intercrosslinking of crosslinked resin component in the cured paint film of 150 to 300, the increase of curing shrinkage strain in the paint film is caused and adhesive property is inferior.

Further, the number average molecular weight of ultraviolet curable four or more functional groups-containing polyfunctional (meth)acrylate of ingredient (A) is from 300 to 2,000, preferably from 320 to 1,500. When the number average molecular weight is more than 2,000, leveling property of the paint film is inferior and it is difficult to obtain the high degree of aesthetic decorative property. On the other hand, when the number average molecular weight is less than 300, flexibility of the paint film is inferior and crack is easily caused in bending test.

The ultraviolet curable four or more functional groups-containing polyfunctional (meth)acrylate of ingredient (A) includes a four or more functional groups-containing polyhydric alcohol (meth)acrylate obtained by esterification of tetravalent or more polyhydric alcohol with (meth)acrylic acid, a four or more functional groups-containing epoxy (meth)acrylate obtained by esterification of epoxy groups of four or more functional groups-containing polyfunctional epoxy compound with (meth)acrylic acid, a four or more functional groups-containing polyurethane(meth)acrylate obtained by reaction of four or more functional groups-containing polyfunctional isocyanate compound with hydroxyl group-containing (meth)acrylate, and a four or more functional groups-containing melamine(meth)acrylate obtained by reaction of methylolmelamine having four or more methylol groups in a molecule with hydroxyl group-containing (meth)acrylate. The four or more functional groups-containing polyfunctional (meth)acrylate of ingredient (A) can be utilized singly or in combination of two or more members.

The four or more functional groups-containing polyhydric alcohol (meth)acrylate includes pentaerythritol tetra(meth)acrylate, ditrimethylolpropane tetra(meth)acrylate, ethoxylated pentaerythritol tetra(meth)acrylate, dipentaerythritol penta(meth)acrylate, xylitolpenta(meth)acrylate, dipentaerythritol hexa(meth)acrylate, glycerildipentaerythritol hepta(meth)acrylate. Commercial compounds of four or more functional groups-containing polyhydric alcohol (meth)acrylate include KAYARAD DPCA-20, KAYARAD DPCA-30, KAYARAD DPCA-60 and KAYARAD DPCA-120 (all trade names, products of NIPPON KAYAKU CO. LTD.).

The four or more functional groups-containing polyfunctional epoxy compound used to prepare the four or more functional group-containing epoxy(meth)acrylate includes glycidyl ether epoxy resins such as phenol novolac type glycidyl ether epoxy resins, orthocresol novolac type glycidyl ether epoxy resins, bisphenol A novolac type glycidyl ether epoxy resins, brominated phenol novolac type glycidyl ether epoxy resins and tetraphenylol ethane type glycidyl ether epoxy resins.

The four or more functional groups-containing polyfunctional isocyanate compound used to prepare the four or more functional group-containing polyurethane(meth)acrylate includes reaction products obtained by reaction of hexamethylene diisocyanate and/or isophorone diisocyanate with four or more functional groups-containing polyhydric alcohol such as pentaerythritol and dipentaerythritol.

The methylolmelamine having four or more methylol groups in a molecule used to prepare the four or more functional group-containing melamine(meth)acrylate includes tetramethylolmelamine, pentamethylolmelamine and hexamethylolmelamine.

The hydroxyl group-containing (meth)acrylate used to prepare the four or more functional group-containing polyurethane(meth)acrylate and the four or more functional group-containing melamine(meth)acrylate includes hydroxyalkyl (meth)acrylates such as 2-hydroxyethyl(meth)acrylate, 2-hydroxypropyl(meth)acrylate, 3-hydroxypropyl (meth)acrylate and 4-hydroxybutyl(meth)acrylate; polyhydric alcohol mono(meth)acrylates such as polyethyleneglycol mono(meth)acrylate, polypropyleneglycol mono(meth)acrylate, neopentylglycol mono(meth)acrylate and glycerin mono(meth)acrylate; ethyleneoxide and/or propyleneoxide addition products of hydroxyalkyl(meth) acrylate such as 2-hydroxyethyl(meth)acrylate, 2-hydroxypropyl(meth)acrylate, 3-hydroxypropyl(meth)acrylate and 4-hydroxybutyl (meth)acrylate.

Among the four or more functional group-containing polyfunctional (meth)acrylates, the polyfunctional (meth)acrylate having the acryloyl group in the molecule has high curability compared with the polyfunctional (meth)acrylate having the methacryloyl group in the molecule. Therefore, the polyfunctional (meth)acrylate having the acryloyl group in the molecule is more preferably used in the present invention.

Ingredient (A) can be utilized singly or in combination of two or more members.

Ingredient (B) used in the present invention is a lactone-modified polymer of polyhydric alcohol mono(meth)acrylate containing 20 to 60 percents by weight of $\epsilon$-caprolactone ring-opening addition product and having a hydroxyl value derived from the lactone modification of 100 to 180 mgKOH/g (hereinafter, it may be called "ingredient (Ba)"), and/or a lactone-modified polyester resin containing 10 to 50 percents by weight of lactone ring-opening addition product and having a hydroxyl value of 50 to 180 mgKOH/g (hereinafter, it may be called "ingredient (Bb)"), The content of $\epsilon$-caprolactone ring-opening addition product in ingredient (Ba) is 20 to 60 percents by weight, preferably 25 to 50 percents by weight. When the content of $\epsilon$-caprolactone ring-opening addition product is less than 20 percents by weight, the scratch resistance of the paint film is not sufficient. When the content of $\epsilon$-caprolactone ring-opening addition product is more than 60 percents by weight, hardness of the paint film is too low and the gasoline resistance of the paint film is inferior.

The hydroxyl value derived from the lactone modification of ingredient (Ba) is 100 to 180 mgKOH/g, preferably 120 to 170 mgKOH/g. The term, "the hydroxyl value derived from the lactone modification" means the hydroxyl value of the hydroxyl group which exist in the end of the structure portion consisting of the $\epsilon$-caprolactone ring-opening addition product in the lactone-modified polymer of polyhydric alcohol mono(meth)acrylate and does not contain the hydroxyl value of the hydroxyl group in the other structure portion. When the hydroxyl value derived from the lactone modification is less than 100 mgKOH/g, the scratch resistance of the paint film is not sufficient. When the hydroxyl value derived from the lactone modification is more than 180 mgKOH/g, the compatibility with the four or more functional groups-containing polyfunctional (meth)acrylate of ingredient (A) is inferior.

The molecular weight of ingredient (Ba) is not limited particularly. The number average molecular weight of ingredient (Ba) is preferably about 2,000 to 20,000 in general.

The lactone-modified polymer of polyhydric alcohol mono(meth)acrylate of ingredient (Ba) can be utilized singly or in combination of two or more members.

The method for preparing ingredient (Ba) includes (1) a preparation method comprising homopolymerizing polycaprolactone-modified polyhydric alcohol mono(meth)acrylate obtained by ring-opening addition of ε-caprolactone to the polyhydric alcohol mono(meth)acrylate or copolymerizing it and other copolymerizable vinyl monomer, and (2) a preparation method comprising ring-opening adding ε-caprolactone to a homopolymer or a copolymer of polyhydric alcohol mono(meth)acrylate which is obtained by homopolymerizing polyhydric alcohol mono(meth)acrylate or copolymerizing it and other copolymerizable vinyl monomer.

The polyhydric alcohol mono(meth)acrylate used in the methods (1) and (2) as described above includes 2-hydroxyethyl(meth)acrylate, 2-hydroxypropyl(meth)acrylate, 3-hydroxypropyl(meth)acrylate and 4-hydroxybutyl(meth)acrylate, polyethyleneglycol mono(meth)acrylate, polypropyleneglycol mono(meth)acrylate, neopentylglycol mono(meth)acrylate and glycerin mono(meth)acrylate. The polyhydric alcohol mono(meth)acrylate can be utilized singly or in combination of two or more members.

The polycaprolactone-modified polyhydric alcohol mono (meth)acrylate used in the method (1) as described above includes polycaprolactone-modified hydroxyalkyl mono (meth)acrylate and polycaprolactone-modified poly(oxyalkylene)mono(meth)acrylate.

Commercial compounds of polycaprolactone-modified polyhydric alcohol mono(meth)acrylate include PLACCEL FA-1 (trade name, produced by Daicel Chemical Industries, LTD., monomer obtained by ring-opening addition of one mole of ε-caprolactone to one mole of 2-hydroxyethyl acrylate), PLACCEL FM-1D, PLACCEL FM-2D, PLACCEL FM-3 and PLACCEL FM-4 (all trade names, produced by Daicel Chemical Industries, LTD., monomer obtained by ring-opening addition of one mole, two moles, three moles or four moles of ε-caprolactone respectively to one mole of 2-hydroxyethyl methacrylate).

The other copolymerizable vinyl monomers used in the methods (1) and (2) as described above include, for example, (meth)acrylic acid and alkyl substitution products thereof; alkyl(meth)acrylates such as methyl(meth)acrylate, ethyl(meth)acrylate, butyl(meth)acrylate, 2-ethylhexyl (meth)acrylate, lauryl(meth)acrylate and stearyl(meth)acrylate; hydroxyalkyl(meth)acrylates such as 2-hydroxyethyl (meth)acrylate and 3-hydroxypropyl(meth)acrylate; esters of dibasic acid such as itaconic acid, maleic acid and fumaric acid; styrene and nuclear-substituted styrenes such as vinyl toluene, dimethyl styrene and ethyl styrene; and (meth) acrylonitrile, (meth)acrylamide, vinyl acetate and vinyl chloride. The other copolymerizable monomer can be utilized singly or in combination of two or more members.

In the polymerization for preparation of ingredient (Ba), a polymerization initiator can be utilized. The polymerization initiator includes organic peroxide polymerization initiators and azo polymerization initiators. The amount of the polymerization initiator is not limited particularly, but preferably 0.5 to 15 percents by weight to total amount of the monomers, in general. Ingredient (Ba) can be utilized singly or in combination of two or more members.

The content of lactone ring-opening addition product in ingredient (Bb) is 10 to 50 percents by weight, preferably 15 to 40 percents by weight. When the content of lactone ring-opening addition product is less than 10 percents by weight, the scratch resistance of the paint film is not sufficient. When the content of lactone ring-opening addition product is more than 50 percents by weight, hardness of the paint film is too low and the gasoline resistance of the paint film is inferior.

The hydroxyl value of ingredient (Bb) is 50 to 180 mgKOH/g, preferably 70 to 170 mgKOH/g. When the hydroxyl value is less than 50 mgKOH/g, the scratch resistance of the paint film is not sufficient. When the hydroxyl value is more than 180 mgKOH/g, the compatibility with the four or more functional groups-containing polyfunctional (meth)acrylate of ingredient (A) is inferior.

The molecular weight of ingredient (Bb) is not limited particularly. The number average molecular weight of ingredient (Bb) is preferably about 1,500 to 20,000, more preferably 1,500 to 5,000 in general.

The method for preparing ingredient (Bb) includes a preparation method comprising ring-opening addition of a lactone to a polyester resin obtained by bonding a polybasic acid and a polyhydric alcohol.

The polybasic acid used in the method described above includes, for example, aromatic polybasic acids such as phthalic acid, isophthalic acid, terephthalic acid, trimellitic acid, pyromellitic acid, tetrachloro phthalic acid, naphthalene dicarboxylic acid, 4,4-diphenylmethane carboxylic acid; alicyclic polybasic acids such as hexahydrophthalic acid, hexahydroisophthalic acid, hexahydroterephthalic acid, hexahydrotrimellitic acid and methyl hexahydroterephthalic acid; saturated and unsaturated aliphatic polybasic acids such as succinic acid, glutaric acid, adipic acid, azelaic acid, sebasic acid, dodecane dicarboxylic acid, pimelic acid, maleic acid, fumaric acid and itaconic acid. Also, anhydrides of the polybasic acids described above and ester-formable substitution product thereof, for example, ester of lower alkyl having 1 to 6 carbon atoms, can be utlized as the polybasic acid. The polybasic acid can be utilized singly or in combination of two or more members.

Examples of the polyhydric alcohol described above are divalent alcohols and trivalent or more alcohols described below.

The divalent alcohols include, for example, glycols such as ethylene glycol, propylene glycol, diethylene glycol, triethylene glycol, 1,4-butanediol, 1,3-butanediol, 2,3-butanediol, 1,2-butanediol, 1,5-pentanediol, 1,4-pentanediol, 2,4-pentanediol, 2,3-dimethyl trimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, 1,4-cyclohexanedimethanol and neopentyl glycol; polyetherdiols such as alkylene oxide addition products of bisphenol A, polyethylene glycol and polypropylene glycol; and monoepoxy compounds such as α-olefin epoxides like propylene oxide and butylene oxide and CARDURA E-10 (trade name, produced by SHELL chemical Co., glycidyl ester of synthetic high branched saturated aliphatic acid).

Further, trivalent or more alcohols include, for example, glycerin, trimethylol ethane, trimethylol propane, diglycerin, pentaerythritol, dipentaerythritol and sorbitol. Also, compounds having two or more epoxy groups in the molecule like bisphenol A diglycidyl ether can be utilized as the trivalent or more alcohol. The polyhydric alcohol can be utilized singly or in combination of two or more members.

For the polyester resins used for preparation of ingredient (Bb), saturated aliphatic fatty acids such as octyl acid, lauryl acid and stearic acid; unsaturated fatty acids such as oleic acid, linoleic acid, linolenic acid and eleostearic acid; monobasic acids such as benzoic acid, abietic acid, acetic acid, propionic acid and butyric acid; hydroxycarboxylic acid compounds such as methylol propionic acid, pivalic acid, 12-hydroxystearic acid and ricinolic acid; and oils and fats such as linseed oil, castor oil, tall oil, cotton seed oil, soybean oil, olive oil and safflower oil can be utilized as other components according to needs, other than the components described above and before. The components described above can be utilized singly or in combination of two or more members.

Lactones used for preparing ingredient (Bb) of the present invention, include ε-caprolactone, γ-butyrolactone, δ-valerolactone, γ-valerolactone, γ-caprolactone, γ-nonanoic lactone and δ-dodecanolactone. In particular, ε-caprolactone is preferably used. The lactone can be utilized singly or in combination of two or more members.

Ingredient (Bb) can be utilized singly or in combination of two or more members.

Ingredient (C) used in the present invention is a non-yellowing polyisocyanate compound and/or an amino resin.

As the non-yellowing polyisocyanate compound, aliphatic and alicyclic polyisocyanate compounds are preferably used. Typical examples are reaction products of hexamethylene diisocyanate and/or isophorone diisocyanate with polyhydric alcohol and/or low molecular weight polyester polyol, isocyanurate compounds such as polymer of hexamethylene diisocyanate and/or isophorone diisocyanate and biuret compounds obtained by further reaction to the urethane bond. Also, blocked isocyanates in which the isocyanate groups in the polymers are masked with hydroxyl group-containing compounds, can be preferably utilized. Further, various non-yellowing polyisocyanate compounds such as polymers of diisocyanate compounds other than the compounds described above can be utilized. The non-yellowing polyisocyanate compound can be utilized singly or in combination of two or more members.

As the amino resin, melamine resins or urea resins used generally for coating compositions can be utilized. The resins include melamine resins or urea resins which are etherificated with lower alcohol such as methanol, n-butanol and isobutanol singly or in mixture thereof. The amino resin can be utilized singly or in combination two or more members.

Further, the non-yellowing polyisocyanate compound and the amino resin can be used in combination.

With respect to the content ratio of ingredient (A), ingredient (B) and ingredient (C), the weight ratio of ingredient (A) to the total weight of ingredient (B) and ingredient (C) is 10:90 to 50:50, preferably 15:85 to 45:55, more preferably 20:80 to 40:60, and the weight ratio of ingredient (B) to ingredient (C) is 90:10 to 20:80, preferably 80:20 to 30:70.

When ingredient (C) is the non-yellowing polyisocyanate compound, the equivalent value of the isocyanate group in ingredient (C) to one equivalent of hydroxyl group in ingredient (B) is preferably 0.5 to 1.5 equivalent, more preferably 0.6 to 1.2 equivalent.

When the content of ingredient (A) is less than the lower limit in the range of the weight ratio of ingredient (A) to the total weight of ingredient (B) and ingredient (C), distinction of image of the cured paint film may be inferior. When the content of ingredient (A) is more than the upper limit of the range, the curing shrinkage of the paint film is increased and the adhesive property is inferior. Further, when the weight ratio of ingredient (C) is less than the lower limit in the range of the weight ratio of ingredient (B) to ingredient (C), curability is not sufficient and gasoline resistance is inferior. When the weight ratio of ingredient (C) is more than the upper limit in the range, the curing shrinkage stress of the paint film is increased and the adhesive property is inferior.

The light stabilizer of ingredient (D) used in the present invention is used for increasing weathering resistance of the paint film. The light stabilizer includes compounds which are dissolved or dispersed homogeneously in the paint film, does not cause curing inhibition at the time of ultraviolet-curable, and does not cause yellowing of the paint film. The light stabilizer includes ultraviolet absorbents and antioxidants. The ultraviolet absorbents include, for example, benzophenone or derivatives thereof, phenylsalicylate or derivatives thereof, benzotriazole or derivatives thereof, and cyanoacrylate or derivatives thereof. Among them, benzotriazole based ultraviolet absorbents are preferable particularly. The antioxidants include phenol based antioxidants, organic phosphite based antioxidants, organic thioether based antioxidants and hindered amine based antioxidants. In particular, the hindered amine based antioxidants are preferable.

The light stabilizer can be utilized singly or in combination of two or more members. The amount of the light stabilizer is preferably 0.5 to 5 parts by weight to 100 parts by weight of the total amount of ingredient (A), ingredient (B) and ingredient (C).

Photopolymerization initiator of ingredient (E) used in the present invention includes benzoin or derivatives thereof, benzophenone or derivatives thereof, acetophenone or derivatives thereof, Michler's ketone, benzyl or derivatives thereof, tetraalkyl chiuram monosulfide and thioxane, having absorption in ultraviolet area of 260 to 450 nm. Among them, acetophenone or derivatives thereof are preferable particularly.

The photopolymerization initiator can be utilized singly or in combination of two or more members. The amount of the photopolymerization initiator is preferably 0.5 to 5 parts by weight to 100 parts by weight of the total amount of ingredient (A), ingredient (B) and ingredient (C).

The ultraviolet-curable coating composition of the present invention can be further formulated properly with one or not less than two members of dilution solvents for controlling viscosity, sensitizers of photopolymerization reaction such as amine compounds, urea compounds and sulfur compounds which are used generally for ultraviolet-curable coating composition, organic peroxides for proceeding the polymerization curing homogeneously, pigments, dyes and the like.

In the ultraviolet-curable coating composition of the present invention, the components described before are formulated to be able to obtain a cured paint film having a Knoop hardness of 10 to 18, preferably 11 to 18 and a molecular weight of intercrosslinking of crosslinked resin component in the cured paint film of 150 to 300, preferably 170 to 280. When the Knoop hardness of the cured paint film is less than 10, gasoline resistance is inferior. When the Knoop hardness of the cured paint film is more than 18, scratch resistance is inferior. When the molecular weight of intercrosslinking of crosslinked resin component in the cured paint film is less than 150, the curing shrinkage strain in the paint film is increased, adhesive property is inferior, and a graphic tape is easily cracked in the case that the ultraviolet-curable coating composition is applied on an article adhered with the graphic tape. On the other hand, when the molecular weight of intercrosslinking of crosslinked resin component in the cured paint film is more than 300, scratch resistance is inferior. Here the graphic tape is generally a graphic tape formed by providing such as printing and applying, of a display such as literatures of maker name, product name and the like, symbols, marks, figures and patterns on the surface of the substrate being a sheet of resin such as vinyl chloride resins and urethane resins, by applying a clear coating composition such as urethane resin clear coating composition on the surface of the display, by drying, and then by pattern-draw-molding. Also, the graphic tape includes graphic tapes formed by providing a display of metal vapor deposition such as aluminum vapor deposition and chromium vapor deposition on the surface of a sheet of resin such as polyethylene terephthalate resin.

Knoop hardness is a hardness of the paint film measured at 20° C. by micro surface hardness meter (produced by Shimazu Co., trade name "HMV-2000"). As the value of Knoop hardness increases, the paint film becomes harder.

The molecular weight of intercrosslinking of crosslinked resin component is a value obtained from dynamic regidity modulus in rubber area of the separated paint film, which is measured in condition of 110 Hz of frequency and 2° C. per minute of increasing rate of temperature by using a forced stretching vibration type viscoelasticity measuring device (produced by Toyo Baldwin Co., trade name "REHOVIBRON DDV-II-EA") and is represented by the following formula.

$$Mc = 293 \times \rho / (\log_{10} G' - 7)$$

In the formula, Mc is the molecular weight of intercrosslinking of crosslinked resin component (g/mol), $\rho$ is a density of the paint film (g/cm$^3$), G' is a dynamic rigidity in rubber area (E'/3 (dyne/cm$^2$)) and E' is a dynamic modulus of elasticity in rubber area (dyne/cm$^2$).

The method of applying the ultraviolet-curable coating composition of the present invention is not limited particularly. For example, after applying and curing a baking curing colored coating composition on an article to be coated beforehand, and adhering a graphic tape or the like on the surface of the baked colored paint film according to needs because of problems in design, the cured paint film can be obtained by applying the ultraviolet-curable coating composition on the coated article described above by methods such as spraying application, electrostatic application and curtain flow application, and irradiating ultraviolet light to cure. In this case, before the ultraviolet light is irradiated, preheating for removing solvents can be provided, or after the ultraviolet light is irradiated, after heating can be provided. The temperature of preheating is not limited, but is preferably not less than 50° C. for increasing volatility of solvent. The temperature of after heating is preferably not less than 80° C. for promoting curing of amino resin. The upper limit of temperature of the preheating or after heating is not limited, but is preferably not more than 200° C.

The irradiation of ultraviolet light is conducted preferably by using an ultraviolet irradiation device, which can irradiate to the surface of three-dimensional coated article almost homogeneously. As ultraviolet light sources, high-pressure mercury lamps, metal halide lamps and the like can be used. The condition of ultraviolet light irradiation for curing the coated article includes a method of irradiating for long time with weak ultraviolet light and a method of irradiating for short time with strong ultraviolet light. Any one of the methods can be selected arbitrarily. When the weak ultraviolet light is irradiated for short time, the amount of ultraviolet energy for giving to the coated film runs short and therefore the curing is defective. When the strong ultraviolet light is irradiated for long time, the amount of ultraviolet energy for giving to the coated film is excess and therefore the paint film causes yellowing discoloration. Preferable amount of ultraviolet energy for curing the coated article is 100 to 5000 mJ/cm$^2$.

The thickness of the paint film obtained by applying the ultraviolet-curable coating composition of the present invention can be selected properly according to needs, but is preferably 10 to 200 μm of the dried thickness, in general.

Coated articles obtained by applying the ultraviolet-curable coating composition of the present invention is not particularly limited, but include structures, wood articles, metallic articles, plastics articles, rubber articles, coated papers, ceramic articles and glass articles, specifically automobiles, parts for automobiles (for example, body, bumper, spoiler, mirror, wheel and inner package material, and these parts are made of various materials), metal plates such as steel plates, two-wheel vehicles, parts for two-wheel vehicles, materials for road (for example, guard rail, traffic control sign and sound-proof wall), materials for tunnel (for example, side wall plate), marine vessels, railway vehicles, airplanes, furnitures, musical instruments, house-hold electric instruments, building materials, vessels, office articles, sport articles and toys.

EXAMPLE

The invention is explained in detail with reference to the following Examples; however, these Examples are intended to illustrate the invention and are not to be construed to limit the scope of the invention. Hereinafter, the term, "part" means "part by weight" and the term, "%", means "% by weight".

Evaluation of the properties of the paint films in Examples and Comparative Examples was conducted as follows.

(1) Scratch Resistance

On a surface of the paint film, a skin was rubbed by reciprocating 1000 times under a load of 1 kg by using a RUBBING TESTER (produced by OHIRA RIKA Industry Co., Ltd.). The scratch trace was observed by visual and the evaluation was conducted according to the following standard.

○: The scratch trace was not observed.
X: The scratch trace was observed.

(2) Distinction of Image

The distinction of image of the cured film was measured by a portable distinction of image and gloss meter PGD-IV produced by TOKYO KODEN Co., Ltd. When the value is not less than 0.9, the distinction of image is good.

(3) Adhesion

The cutting lines were marked on the paint film by a cutting knife as the cut reached to the substrate under the paint film and 100 of cross-hathced square (1 mm×1 mm) were depicted. A pressure sensitive adhesive cellophane tape was adhered on the surface of the paint film, and then peeled rapidly from the surface of the paint film. The condition of the peeled surface of the paint film was observed and the adhesion was evaluated according to the following Standard.

○: The peeling of the cross-cut marked paint film was not observed at all.

X: The number of the peeling of the cross-cut marked paint film was not less than 10.

(4) Gasoline Resistance

The test piece was immersed in regular gasoline (produced by NIPPON OIL CORPORATION) at 20° C. for 24 hours. The appearance of the test piece was observed by visual. The gasoline resistance was evaluated according to the following standard.

○: The abnormality on the paint film was not observed.

X: The abnormality such as yellowing and blistering on the paint film was observed.

(5) Resistance Against to Graphic Tape Test

The part of the paint film on which a graphic tape (produced by SUMITOMO 3M Co.) was adhered, was observed by visual. The resistance against to graphic tape test was evaluated according to the following standard.

○: The abnormality on the paint film was not observed.

X: The abnormality such as cracking and contraction on the paint film was observed.

Examples 1 to 13

Preparation of Ultraviolet-curable Coating Composition

The ultraviolet-curable coating compositions were prepared by mixing homogeneously all components of components (A) to (E) and SOLVESSO 100 indicated in Tables 1 to 4 in the ratio of the formulation amount indicated in Tables 1 to 4.

Preparation of Test Pieces

Acrylic resin/melamine resin based white coat solid coating composition (trade name "BELCOAT HS-1 WHITE", a product of BASF NOF Coatings Co., Ltd.) was applied by spraying to a PB-137 treated dull steel plate (70 mm in length, 150 mm in width and 0.8 mm in thickness) in an amount to form a film having dried thickness of 40 μm. After leaving the coated steel plate at room temperature for 10 minutes, the coated steel plate was baked at 140° C. for 30 minutes. A graphic tape (produced by SUMITOMO 3M Co.) was adhered or not adhered on a part of the surface of the coated steel plate and then the ultraviolet-curable coating compositions of Examples 1 to 13 were applied by spraying to coated steel plate adhered with the graphic tape or without the graphic tape in an amount to form a film having dried thickness of 60 μm. The coated steel plate was left at room temperature for 2 minutes. And then, the coated steel plate was heated for 3 minutes to reach the temperature of 70° C. by a far infrared heater (produced by NIHON GAISHI Co., Ltd., trade name "INFRASHUTAIN") and irradiated with ultraviolet light for 2 seconds by a metal halide lamp (produced by NIPPON DENCHI Co., Ltd., 20 cm in length, 3 bulbs, 4.8 kW) which is equipped at the distance of 20 cm from the coated steel plate. After this ultraviolet irradiation, the coated steel plate was heated for 5 minutes to reach the temperature of 120° C. by the far infrared heater to obtain test pieces. The properties of the obtained test pieces are shown in the low portion of Tables 1 to 4.

TABLE 1

| | | Example 1 | Example 2 | Example 3 |
|---|---|---|---|---|
| Component(A) | A1 (*1) | 10.0 | 15.0 | 20.0 |
| | A2 (*2) | — | — | — |
| | A3 (*3) | — | — | — |
| Component(B) | B1 (*4) | 48.9 | 42.8 | — |
| | B2 (*5) | — | — | — |
| | B3 (*6) | — | — | — |
| | B4 (*7) | — | — | 36.7 |
| | B5 (*8) | — | — | — |
| Component(C) | C1 (*14) | 20.7 | 18.1 | 15.5 |
| Component(D) | D1 (*17) | 0.5 | 0.5 | 0.5 |
| | D2 (*18) | 0.5 | 0.5 | 0.5 |
| Component(E) | E1 (*19) | 0.5 | 0.5 | 0.5 |
| SOLVESSO 100 (*20) | | 18.9 | 22.6 | 26.3 |
| Total | | 100.0 | 100.0 | 100.0 |
| Component (A)/Components (B) and (C) (weight ratio of nonvolatile matter) | | 20/80 | 30/70 | 40/60 |
| Component (B)/Component (C) (weight ratio of nonvolatile matter) | | 61/39 | 61/39 | 61/39 |
| Equivalent ratio of NCO groups of Component(C) to hydroxyl group of Component(B) | | 1.0 | 1.0 | 1.0 |
| Properties of cured paint film | Knoop hardness | 15.0 | 17.5 | 15.0 |
| | molecular weight of intercrosslinking | 240 | 210 | 180 |
| | scratch resistance | ○ | ○ | ○ |
| | distinction of image | 1.0 | 1.0 | 1.0 |
| | adhesion | ○ | ○ | ○ |
| | gasoline resistance | ○ | ○ | ○ |
| | resistance to graphic tape test | ○ | ○ | ○ |

TABLE 2

| | | Example 4 | Example 5 | Example 6 |
|---|---|---|---|---|
| Component (A) | A1 (*1) | 10.0 | 15.0 | 20.0 |
| | A2 (*2) | — | — | — |
| | A3 (*3) | — | — | — |
| Component (B) | B1 (*4) | 60.0 | 52.5 | — |
| | B2 (*5) | — | — | — |
| | B3 (*6) | — | — | — |
| | B4 (*7) | — | — | 45.0 |
| | B5 (*8) | — | — | — |
| Component (C) | C2 (*15) | 14.3 | 12.5 | 10.7 |
| Component (D) | D1 (*17) | 0.5 | 0.5 | 0.5 |
| | D2 (*18) | 0.5 | 0.5 | 0.5 |
| Component (E) | E1 (*19) | 0.5 | 0.5 | 0.5 |
| SOLVESSO 100 (*20) | | 14.2 | 20.0 | 22.8 |
| Total | | 100.0 | 100.0 | 100.0 |
| Component (A)/Components (B) and (C) (weight ratio of nonvolatile matter) | | 20/80 | 30/70 | 40/60 |
| Component (B)/Component (C) (weight ratio of nonvolatile matter) | | 75/25 | 75/25 | 75/25 |
| Properties of cured paint film | Knoop hardness | 13.5 | 14.5 | 17.0 |
| | molecular weight of intercrosslinking | 220 | 200 | 175 |
| | scratch resistance | ○ | ○ | ○ |
| | distinction of image | 1.0 | 1.0 | 1.0 |
| | adhesion | ○ | ○ | ○ |
| | gasoline resistance | ○ | ○ | ○ |
| | resistance to graphic tape test | ○ | ○ | ○ |

TABLE 3

|  |  | Example 7 | Example 8 | Example 9 | Example 10 |
|---|---|---|---|---|---|
| Component (A) | A1 (*1) | 10.0 | 15.0 | 20.0 | 10.0 |
|  | A2 (*2) | — | — | — | — |
|  | A3 (*3) | — | — | — | — |
| Component (B) | B1 (*4) | — | — | — | 24.5 |
|  | B3 (*6) | — | — | — | — |
|  | B4 (*7) | — | — | — | — |
|  | B5 (*8) | — | — | — | — |
|  | B6 (*9) | 59.7 | 52.5 | 45.0 | 24.5 |
|  | B10 (*13) | — | — | — | — |
| Component (C) | C1 (*14) | 13.5 | 11.7 | 10.0 | 20.7 |
|  | C2 (*15) | — | — | — | — |
|  | C3 (*16) | — | — | — | — |
| Component (D) | D1 (*17) | 0.5 | 0.5 | 0.5 | 0.5 |
|  | D2 (*18) | 0.5 | 0.5 | 0.5 | 0.5 |
| Component (E) | E1 (*19) | 0.5 | 0.5 | 0.5 | 0.5 |
| SOLVESSO 100 (*20) |  | 15.3 | 19.3 | 23.5 | 18.8 |
| Total |  | 100.0 | 100.0 | 100.0 | 100.0 |
| Component (A)/Components (B) and (C) (weight ratio of nonvolatile matter) |  | 20/80 | 30/70 | 40/60 | 20/80 |
| Component (B)/Component (C) (weight ratio of nonvolatile matter) |  | 75/25 | 75/25 | 75/25 | 61/39 |
| Equivalent ratio of NCO groups of Component(C) to hydroxyl group of Component(B) |  | 0.75 | 0.75 | 0.75 | 1.0 |
| Properties of cured paint film | Knoop hardness | 15.0 | 16.0 | 17.0 | 13.0 |
|  | molecular weight of intercrosslinking | 250 | 230 | 220 | 230 |
|  | scratch resistance | ○ | ○ | ○ | ○ |
|  | distinction of image | 1.0 | 1.0 | 1.0 | 1.0 |
|  | adhesion | ○ | ○ | ○ | ○ |
|  | gasoline resistance | ○ | ○ | ○ | ○ |
|  | resistance to graphic tape test | ○ | ○ | ○ | ○ |

TABLE 4

|  |  | Example 11 | Example 12 | Example 13 |
|---|---|---|---|---|
| Component (A) | A1 (*1) | 15.0 | 15.0 | 15.0 |
|  | A2 (*2) | — | — | — |
|  | A3 (*3) | — | — | — |
| Component (B) | B1 (*4) | — | — | 52.5 |
|  | B6 (*9) | 52.5 | 52.5 | — |
| Component (C) | C1 (*14) | — | — | — |
|  | C2 (*15) | 12.5 | 6.3 | 6.3 |
|  | C3 (*16) | — | 7.3 | 7.3 |
| Component (D) | D1 (*17) | 0.5 | 0.5 | 0.5 |
|  | D2 (*18) | 0.5 | 0.5 | 0.5 |
| Component (E) | E1 (*19) | 0.5 | 0.5 | 0.5 |
| SOLVESSO 100 (*20) |  | 18.5 | 17.4 | 17.4 |
| Total |  | 100.0 | 100.0 | 100.0 |
| Component (A)/Components (B) and (C) (weight ratio of nonvolatile matter) |  | 30/70 | 30/70 | 30/70 |
| Component (B)/Component (C) (weight ratio of nonvolatile matter) |  | 75/25 | 75/25 | 75/25 |
| Properties of cured paint film | Knoop hardness | 17.0 | 16.5 | 14.0 |
|  | molecular weight of intercrosslinking | 210 | 220 | 280 |
|  | scratch resistance | ○ | ○ | ○ |
|  | distinction of image | 1.0 | 1.0 | 1.0 |
|  | adhesion | ○ | ○ | ○ |
|  | gasoline resistance | ○ | ○ | ○ |
|  | resistance to graphic tape test | ○ | ○ | ○ |

Comparative Examples 1 Through 30

The ultraviolet-curable coating compositions were prepared by mixing homogeneously all components of components (A) to (E) and SOLVESSO 100 indicated in Tables 5 to 11 in the ratio of the formulation amount indicated in Tables 5 to 11.

Next, test pieces were prepared in the same method as described in Example 1 except that each of the coating composition of Comparative Examples 1 to 30 was used instead of the ultraviolet-curable coating composition of Example 1. The properties of the obtained test pieces are shown in the low portion of Tables 5 to 11.

TABLE 5

|  |  | Comparative Example 1 | Comparative Example 2 | Comparative Example 3 | Comparative Example 4 | Comparative Example 5 |
|---|---|---|---|---|---|---|
| Component (A) | A1 (*1) | — | — | 10.0 | 10.0 | 2.5 |
|  | A2 (*2) | 10.0 | — | — | — | — |
|  | A3 (*3) | — | 25.0 | — | — | — |
| Component (B) | B1 (*4) | 48.9 | 30.6 | — | — | 58.1 |
|  | B2 (*5) | — | — | 48.7 | — | — |
|  | B3 (*6) | — | — | — | 60.5 | — |
|  | B4 (*7) | — | — | — | — | — |
|  | B5 (*8) | — | — | — | — | — |
| Component (C) | C1 (*14) | 20.7 | 12.9 | 20.9 | 13.0 | 24.6 |
| Component (D) | D1 (*17) | 0.5 | 0.5 | 0.5 | 0.5 | 0.5 |
|  | D2 (*18) | 0.5 | 0.5 | 0.5 | 0.5 | 0.5 |
| Component (E) | E1 (*19) | 0.5 | 0.5 | 0.5 | 0.5 | 0.5 |
| SOLVESSO 100 (*20) | | 18.9 | 30.0 | 18.9 | 15.0 | 13.3 |
| Total | | 100.0 | 100.0 | 100.0 | 100.0 | 100.0 |
| Component (A)/Components (B) and (C) (weight ratio of nonvolatile matter) | | 20/80 | 50/50 | 20/80 | 20/80 | 5/95 |
| Equivalent ratio of NCO groups of Component(C) to hydroxyl group of Component(B) | | 1.0 | 1.0 | 1.0 | 1.0 | 1.0 |
| Properties of cured paint film | Knoop hardness | 5.0 | 17.5 | 15.0 | 16.0 | 14.5 |
|  | molecular weight of intercrosslinking | 520 | 230 | 240 | 255 | 460 |
|  | scratch resistance | ○ | ○ | X | X | X |
|  | distinction of image | 1.0 | 1.0 | 1.0 | 1.0 | 0.9 |
|  | adhesion | ○ | X | ○ | ○ | ○ |
|  | gasoline resistance | X | ○ | ○ | ○ | ○ |
|  | resistance to graphic tape test | ○ | X | ○ | ○ | ○ |

TABLE 6

|  |  | Comparative Example 6 | Comparative Example 7 | Comparative Example 8 | Comparative Example 9 |
|---|---|---|---|---|---|
| Component (A) | A1 (*1) | 40.0 | 7.5 | 10.0 | 5.0 |
|  | A2 (*2) | — | — | — | 5.0 |
|  | A3 (*3) | — | — | — | — |
| Component (B) | B1 (*4) | 12.2 | — | — | 48.9 |
|  | B2 (*5) | — | — | — | — |
|  | B3 (*6) | — | — | — | — |
|  | B4 (*7) | — | 52.0 | — | — |
|  | B5 (*8) | — | — | 48.7 | — |
| Component (C) | C1 (*14) | 5.2 | 22.0 | 20.9 | 20.7 |
| Component (D) | D1 (*17) | 0.5 | 0.5 | 0.5 | 0.5 |
|  | D2 (*18) | 0.5 | 0.5 | 0.5 | 0.5 |
| Component (E) | E1 (*19) | 0.5 | 0.5 | 0.5 | 0.5 |
| SOLVESSO 100 (*20) | | 41.1 | 17.0 | 18.9 | 18.9 |
| Total | | 100.0 | 100.0 | 100.0 | 100.0 |
| Component (A)/Components (B) and (C) (weight ratio of nonvolatile matter) | | 80/20 | 15/85 | 20/80 | 20/80 |
| Equivalent ratio of NCO groups of Component(C) to hydroxyl group of Component(B) | | 1.0 | 1.0 | 1.0 | 1.0 |
| Properties of cured paint film | Knoop hardness | 22.0 | 4.0 | 22.0 | 10.0 |
|  | molecular weight of intercrosslinking | 160 | 250 | 250 | 380 |
|  | scratch resistance | X | ○ | X | X |
|  | distinction of image | 1.0 | 1.0 | 1.0 | 1.0 |
|  | adhesion | X | ○ | ○ | ○ |
|  | gasoline resistance | ○ | X | ○ | ○ |
|  | resistance to graphic tape test | X | ○ | ○ | ○ |

TABLE 7

|  |  | Comparative Example 10 | Comparative Example 11 | Comparative Example 12 | Comparative Example 13 | Comparative Example 14 |
|---|---|---|---|---|---|---|
| Component (A) | A1 (*1) | — | — | 10.0 | 10.0 | 2.5 |
|  | A2 (*2) | 10.0 | — | — | — | — |
|  | A3 (*3) | — | 25.0 | — | — | — |
| Component (B) | B1 (*4) | 60.0 | 37.5 | — | — | 71.3 |
|  | B2 (*5) | — | — | 60 | — | — |
|  | B3 (*6) | — | — | — | 60 | — |
|  | B4 (*7) | — | — | — | — | — |
|  | B5 (*8) | — | — | — | — | — |
| Component (C) | C2 (*15) | 14.3 | 8.9 | 14.3 | 14.3 | 17.0 |
| Component (D) | D1 (*17) | 0.5 | 0.5 | 0.5 | 0.5 | 0.5 |
|  | D2 (*18) | 0.5 | 0.5 | 0.5 | 0.5 | 0.5 |
| Component (E) | E1 (*19) | 0.5 | 0.5 | 0.5 | 0.5 | 0.5 |
| SOLVESSO 100 (*20) |  | 14.2 | 27.1 | 14.2 | 14.2 | 7.7 |
| Total |  | 100.0 | 100.0 | 100.0 | 100.0 | 100.0 |
| Component (A)/Components (B) and (C) (weight ratio of nonvolatile matter) |  | 20/80 | 50/50 | 20/80 | 20/80 | 5/95 |
| Component (B)/Component (C) (weight ratio of nonvolatile matter) |  | 75/25 | 75/25 | 75/25 | 75/25 | 75/25 |
| Properties of cured paint film | Knoop hardness | 6.0 | 17.5 | 16.5 | 17.0 | 14.0 |
|  | molecular weight of intercrosslinking | 500 | 180 | 240 | 285 | 500 |
|  | scratch resistance | ○ | ○ | X | X | X |
|  | distinction of image | 1.0 | 1.0 | 1.0 | 1.0 | 0.9 |
|  | adhesion | ○ | X | ○ | ○ | ○ |
|  | gasoline resistance | X | ○ | ○ | ○ | ○ |
|  | resistance to graphic tape test | ○ | X | ○ | ○ | ○ |

TABLE 8

|  |  | Comparative Example 15 | Comparative Example 16 | Comparative Example 17 | Comparative Example 18 |
|---|---|---|---|---|---|
| Component (A) | A1 (*1) | 40.0 | 7.5 | 10.0 | 5.0 |
|  | A2 (*2) | — | — | — | 5.0 |
|  | A3 (*3) | — | — | — | — |
| Component (B) | B1 (*4) | 15.0 | — | — | 60 |
|  | B2 (*5) | — | — | — | — |
|  | B3 (*6) | — | — | — | — |
|  | B4 (*7) | — | 63.8 | — | — |
|  | B5 (*8) | — | — | 60 | — |
| Component (C) | C2 (*15) | 3.6 | 17.7 | 14.3 | 14.3 |
| Component (D) | D1 (*17) | 0.5 | 0.5 | 0.5 | 0.5 |
|  | D2 (*18) | 0.5 | 0.5 | 0.5 | 0.5 |
| Component (E) | E1 (*19) | 0.5 | 0.5 | 0.5 | 0.5 |
| SOLVESSO 100 (*20) |  | 39.9 | 9.5 | 14.2 | 14.2 |
| Total |  | 100.0 | 100.0 | 100.0 | 100.0 |
| Component (A)/Components (B) and (C) (weight ratio of nonvolatile matter) |  | 80/20 | 15/85 | 20/80 | 20/80 |
| Component (B)/Component (C) (weight ratio of nonvolatile matter) |  | 75/25 | 75/25 | 75/25 | 75/25 |
| Properties of cured paint film | Knoop hardness | 23.0 | 5.5 | 22.5 | 10.0 |
|  | molecular weight of intercrosslinking | 150 | 240 | 250 | 390 |
|  | scratch resistance | X | ○ | X | X |
|  | distinction of image | 1.0 | 1.0 | 1.0 | 1.0 |
|  | adhesion | X | ○ | ○ | ○ |
|  | gasoline resistance | ○ | X | ○ | ○ |
|  | resistance to graphic tape test | X | ○ | ○ | ○ |

TABLE 9

|  |  | Comparative Example 19 | Comparative Example 20 | Comparative Example 21 | Comparative Example 22 | Comparative Example 23 |
|---|---|---|---|---|---|---|
| Component (A) | A1 (*1) | — | — | 15.0 | 15.0 | 2.5 |
|  | A2 (*2) | 15.0 | — | — | — | — |
|  | A3 (*3) | — | 25.0 | — | — | — |
| Component (B) | B6 (*9) | 52.5 | 37.5 | — | — | 71.3 |
|  | B7 (*10) | — | — | 52.5 | — | — |
|  | B8 (*11) | — | — | — | 61.6 | — |
|  | B9 (*12) | — | — | — | — | — |
|  | B10 (*13) | — | — | — | — | — |
| Component (C) | C1 (*14) | 11.7 | 8.3 | 11.7 | 5.6 | 15.8 |
|  | C2 (*15) | — | — | — | — | — |
|  | C3 (*16) | — | — | — | — | — |
| Component (D) | D1 (*17) | 0.5 | 0.5 | 0.5 | 0.5 | 0.5 |
|  | D2 (*18) | 0.5 | 0.5 | 0.5 | 0.5 | 0.5 |
| Component (E) | E1 (*19) | 0.5 | 0.5 | 0.5 | 0.5 | 0.5 |
| SOLVESSO 100 (*20) |  | 19.3 | 27.7 | 19.3 | 16.3 | 8.9 |
| Total |  | 100.0 | 100.0 | 100.0 | 100.0 | 100.0 |
| Component (A)/Components (B) and (C) (weight ratio of nonvolatile matter) |  | 30/70 | 50/50 | 30/70 | 30/70 | 5/95 |
| Component (B)/Component (C) (weight ratio of nonvolatile matter) |  | 75/25 | 75/25 | 75/25 | 88/12 | 75/25 |
| Equivalent ratio of NCO groups of Component(C) to hydroxyl group of Component(B) |  | 0.74 | 0.73 | 0.74 | 0.75 | 0.73 |
| Properties of cured paint film | Knoop hardness | 4.0 | 16.5 | 16.0 | 16.0 | 13.0 |
|  | molecular weight of intercrosslinking | 520 | 260 | 230 | 280 | 460 |
|  | scratch resistance | X | ○ | X | X | X |
|  | distinction of image | 1.0 | 1.0 | 1.0 | 1.0 | 1.0 |
|  | adhesion | ○ | X | ○ | ○ | ○ |
|  | gasoline resistance | X | ○ | ○ | ○ | ○ |
|  | resistance to graphic tape test | ○ | X | ○ | ○ | ○ |

TABLE 10

|  |  | Comparative Example 24 | Comparative Example 25 | Comparative Example 26 | Comparative Example 27 |
|---|---|---|---|---|---|
| Component (A) | A1 (*1) | 40.0 | 7.5 | 15.0 | 15.0 |
|  | A2 (*2) | — | — | — | 10.0 |
|  | A3 (*3) | — | — | — | — |
| Component (B) | B6 (*9) | 15.0 | — | — | 52.5 |
|  | B7 (*10) | — | — | — | — |
|  | B8 (*11) | — | — | — | — |
|  | B9 (*12) | — | 63.8 | — | — |
|  | B10 (*13) | — | — | 52.5 | — |
| Component (C) | C1 (*14) | 3.3 | 14.2 | 11.7 | 11.7 |
|  | C2 (*15) | — | — | — | — |
|  | C3 (*16) | — | — | — | — |
| Component (D) | D1 (*17) | 0.5 | 0.5 | 0.5 | 0.5 |
|  | D2 (*18) | 0.5 | 0.5 | 0.5 | 0.5 |
| Component (E) | E1 (*19) | 0.5 | 0.5 | 0.5 | 0.5 |
| SOLVESSO 100 (*20) |  | 40.2 | 13.0 | 19.3 | 19.3 |
| Total |  | 100.0 | 100.0 | 100.0 | 100.0 |
| Component (A)/Components (B) and (C) (weight ratio of nonvolatile matter) |  | 80/20 | 15/85 | 30/70 | 30/70 |
| Component (B)/Component (C) (weight ratio of nonvolatile matter) |  | 75/25 | 75/25 | 75/25 | 75/25 |
| Equivalent ratio of NCO groups of Component(C) to hydroxyl group of Component(B) |  | 0.73 | 0.74 | 0.74 | 0.74 |
| Properties of cured paint film | Knoop hardness | 21.0 | 4.0 | 22.0 | 10.0 |
|  | molecular weight of intercrosslinking | 160 | 250 | 250 | 380 |
|  | scratch resistance | X | ○ | X | X |
|  | distinction of image | 1.0 | 1.0 | 1.0 | 1.0 |
|  | adhesion | X | ○ | ○ | ○ |

TABLE 10-continued

|  | Comparative Example 24 | Comparative Example 25 | Comparative Example 26 | Comparative Example 27 |
|---|---|---|---|---|
| gasoline resistance | ○ | X | ○ | ○ |
| resistance to graphic tape test | X | ○ | ○ | ○ |

TABLE 11

| | | Comparative Example 28 | Comparative Example 29 | Comparative Example 30 |
|---|---|---|---|---|
| Component (A) | A1 (*1) | 40.0 | 7.5 | 15.0 |
| | A2 (*2) | — | — | — |
| | A3 (*3) | — | — | — |
| Component (B) | B1 (*4) | 15.0 | — | — |
| | B2 (*5) | — | — | — |
| | B3 (*6) | — | — | — |
| | B4 (*7) | — | 63.8 | — |
| | B5 (*8) | — | — | 52.5 |
| Component (C) | C1 (*14) | — | — | — |
| | C2 (*15) | 3.5 | 15.2 | 12.5 |
| | C3 (*16) | — | — | — |
| Component (D) | D1 (*17) | 0.5 | 0.5 | 0.5 |
| | D2 (*18) | 0.5 | 0.5 | 0.5 |
| Component (E) | E1 (*19) | 0.5 | 0.5 | 0.5 |
| SOLVESSO 100 (*20) | | 40.0 | 12.0 | 18.5 |
| Total | | 100.0 | 100.0 | 100.0 |
| Component (A)/Components (B) and (C) (weight ratio of nonvolatile matter) | | 80/20 | 15/85 | 30/70 |
| Component (B)/Component (C) (weight ratio of nonvolatile matter) | | 75/25 | 75/25 | 75/25 |
| Properties of cured paint film | Knoop hardness | 22.0 | 7.0 | 24.0 |
| | molecular weight of intercrosslinking | 150 | 250 | 220 |
| | scratch resistance | X | ○ | X |
| | distinction of image | 1.0 | 1.0 | 1.0 |
| | adhesion | X | ○ | ○ |
| | gasoline resistance | ○ | X | ○ |
| | resistance to graphic tape test | X | ○ | ○ |

In Tables 1 to 11, the suffixed numerical characters indicate the following.

*1: SR-295 (trade name, produced by NIPPON KAYAKU Co., Ltd., pentaerythritol tetraacrylate, number of functional groups: 4, number average molecular weight: 352.

*2: KAYARAD PEG400DA (trade name, produced by NIPPON KAYAKU Co., Ltd., polyethylene glycol diacrylate, number of functional groups: 2, number average molecular weight: 522.

*3: KAYARAD TMPTA (trade name, produced by NIPPON KAYAKU Co., Ltd. trimethylolpropane triacrylate, number of functional groups: 3, number average molecular weight: 296.

*4: resin varnish (lactone-modified polymer of polyhydric alcohol mono(meth)acrylate) containing 29% of ε-caprolactone ring-opening addition product and 50% of a nonvolatile matter, and having a hydroxyl value derived from the lactone modification of 140 mgKOH/g and a number average molecular weight of 3,000, which was prepared by charging a mixture of xylene and isobutyl acetate (weight ratio: 90/10) into a reaction vessel equipped with a stirrer, a thermometer, a reflux condenser and a dropping vessel of monomer, and heating under stirring until the reflux, and dropping a solution consisting of 10 parts of styrene, 27 parts of butyl methacrylate, 61 parts of PLACCEL FM-1D, 2 parts of acrylic acid and 5 parts of a polymerization initiator (produced by NOF CORPORATION, trade name "PERBUTYL O", t-butylperoxy-2-ethylhexanoate) at constant velocity, and copolymerizing the monomers.

*5: resin varnish (lactone-modified polymer of polyhydric alcohol mono(meth)acrylate) containing 50% of a nonvolatile matter, and having a hydroxyl value of 142 mgKOH/g and a number average molecular weight of 3,000, which was prepared by charging a mixture of xylene and isobutyl acetate (weight ratio: 90/10) into a reaction vessel equipped with a stirrer, a thermometer, a reflux condenser and a dropping vessel of monomer, and heating under stirring until the reflux, and dropping a solution consisting of 10 parts of styrene, 42 parts of butyl methacrylate, 13 parts of butylacrylate, 33 parts of 2-hydroxyethyl methacrylate, 2 parts of acrylic acid and 5 parts of a polymerization initiator (produced by NOF CORPORATION, trade name "PERBUTYL O", t-butylperoxy-2-ethylhexanoate) at constant velocity, and copolymerizing the monomers.

*6: resin varnish (lactone-modified polymer of polyhydric alcohol mono(meth)acrylate) containing 14.5% of ε-caprolactone ring-opening addition product and 50% of a nonvolatile matter, and having a hydroxyl value derived from the lactone modification of 71 mgKOH/g and a number average molecular weight of 3,000, which was prepared by charging a mixture of xylene and isobutyl acetate (weight ratio: 90/10) into a reaction vessel equipped with a stirrer, a thermometer, a reflux condenser and a dropping vessel of monomer, and heating under stirring until the reflux, and dropping a solution consisting of 10 parts of styrene, 57 parts of butyl methacrylate, 31 parts of PLACCEL FM-1D, 2 parts of acrylic acid and 5 parts of a polymerization initiator (produced by NOF CORPORATION, trade name "PERBUTYL O", t-butylperoxy-2-ethylhexanoate) at constant velocity, and copolymerizing the monomers.

*7: resin varnish (lactone-modified polymer of polyhydric alcohol mono(meth)acrylate) containing 29% of ε-caprolactone ring-opening addition product and 50% of a nonvolatile matter, and having a hydroxyl value derived from the lactone modification of 140 mgKOH/g and a number average molecular weight of 3,000, which was prepared by charging a mixture of xylene and isobutyl acetate (weight ratio: 90/10) into a reaction vessel equipped with a stirrer, a thermometer, a reflux condenser and a dropping vessel of monomer, and heating under stirring until the reflux, and dropping a solution consisting of 10 parts of styrene, 27 parts of butyl acrylate, 61 parts of PLACCEL FM-1D, 2 parts of acrylic acid and 5 parts of a polymerization initiator (produced by NOF CORPORATION, trade name "PERBUTYL O", t-butylperoxy-2-ethylhexanoate) at constant velocity, and copolymerizing the monomers.

*8: resin varnish containing 21% of ε-caprolactone ring-opening addition product and 50% of a nonvolatile matter, and having a hydroxyl value derived from the lactone modification of 101 mgKOH/g and a number average molecular weight of 3,000, which was prepared by charging a mixture of xylene and isobutyl acetate (weight ratio: 90/10) into a reaction vessel equipped with a stirrer, a thermometer, a reflux condenser and a dropping vessel of monomer, and heating under stirring until the reflux, and dropping a solution consisting of 10 parts of styrene, 44 parts of butyl methacrylate, 44 parts of PLACCEL FM-1D, 2 parts of acrylic acid and 5 parts of a polymerization initiator (produced by NOF CORPORATION, trade name "PERBUTYL O", t-butylperoxy-2-ethylhexanoate) at constant velocity, and copolymerizing the monomers.

*9: resin varnish containing 20% of ε-caprolactone ring-opening addition product and 50% of a nonvolatile matter, and having a hydroxyl value of 100 mgKOH/g, an acid value of 12 mgKOH/g and a number average molecular weight of 3,000, which was prepared by charging 400 parts of phthalic acid anhydride, 185 parts of trimethylol propane, 129 parts of adipic acid and 286 parts of 1,6-hexanediol into a reaction vessel equipped with a stirrer, a thermometer, a device for removing water produced in the reaction and a introduction tube of nitrogen gas, and heating under stirring in the atmosphere of nitrogen gas until the temperature reached to 160° C., keeping the mixture to the temperature of 160° C. for 1 hour, increasing the temperature to 220° C. for 6 hours while removing condensed water produced in the reaction to keep the temperature of 220° C., cooling the mixture to 100° C. at the time that the acid value became to 15 mgKOH/g, charging 500 parts of a mixture of xylene and isobutyl acetate (weight ratio: 90/10) and 231 parts of ε-caprolactone, heating the mixture to 140° C., keeping the same temperature for 15 hours, and diluting the mixture by adding a mixture of xylene and isobutyl acetate (weight ratio: 90/10) as the nonvolatile matter was 50%.

*10: resin varnish containing 50% of a nonvolatile matter, and having a hydroxyl value of 100 mgKOH/g, an acid value of 12 mgKOH/g and a number average molecular weight of 2,400, which was prepared by charging 320 parts of phthalic acid anhydride, 122 parts of trimethylol propane, 210 parts of adipic acid and 348 parts of 1,6-hexanediol into a reaction vessel equipped with a stirrer, a thermometer, a device for removing water produced in the reaction and a introduction tube of nitrogen gas, and heating under stirring in the atmosphere of nitrogen gas until the temperature reached to 160° C., keeping the mixture to the temperature of 160° C. for 1 hour, increasing the temperature to 220° C. for 6 hours while removing condensed water produced in the reaction to keep the temperature of 220° C., cooling the mixture to 100° C. at the time that the acid value became to 12 mgKOH/g, and diluting the mixture by adding a mixture of xylene and isobutyl acetate (weight ratio: 90/10) as the nonvolatile matter was 50%.

*11: resin varnish containing 20% of ε-caprolactone ring-opening addition product and 50% of a nonvolatile matter, and having a hydroxyl value of 40 mgKOH/g, an acid value of 12 mgKOH/g and a number average molecular weight of 2,500, which was prepared by charging 400 parts of phthalic acid anhydride, 20 parts of trimethylol propane, 140 parts of adipic acid and 440 parts of 1,6-hexanediol into a reaction vessel equipped with a stirrer, a thermometer, a device for removing water produced in the reaction and a introduction tube of nitrogen gas, and heating under stirring in the atmosphere of nitrogen gas until the temperature reached to 160° C., keeping the mixture to the temperature of 160° C. for 1 hour, increasing the temperature to 220° C. for 6 hours while removing condensed water produced in the reaction to keep the temperature of 220° C., cooling the mixture to 100° C. at the time that the acid value became to 15 mgKOH/g, charging 500 parts of a mixture of xylene and isobutyl acetate (weight ratio: 90/10) and 230 parts of ε-caprolactone, heating the mixture to 140° C., keeping the same temperature for 15 hours, and diluting the mixture by adding a mixture of xylene and isobutyl acetate (weight ratio: 90/10) as the nonvolatile matter was 50%.

*12: resin varnish containing 40% of ε-caprolactone ring-opening addition product and 50% of a nonvolatile matter, and having a hydroxyl value of 100 mgKOH/g, an acid value of 12 mgKOH/g and a number average molecular weight of 2,800, which was prepared by charging 100 parts of phthalic acid anhydride, 278 parts of trimethylol propane, 427 parts of adipic acid and 195 parts of 1,6-hexanediol into a reaction vessel equipped with a stirrer, a thermometer, a device for removing water produced in the reaction and a introduction tube of nitrogen gas, and heating under stirring in the atmosphere of nitrogen gas until the temperature reached to 160° C., keeping the mixture to the temperature of 160° C. for 1 hour, increasing the temperature to 220° C. for 6 hours while removing condensed water produced in the reaction to keep the temperature of 220° C., cooling the mixture to 100° C. at the time that the acid value became to 20 mgKOH/g, charging 500 parts of a mixture of xylene and isobutyl acetate (weight ratio: 90/10) and 592 parts of ε-caprolactone, heating the mixture to 140° C., keeping the same temperature for 15 hours, and diluting the mixture by adding a mixture of xylene and isobutyl acetate (weight ratio: 90/10) as the nonvolatile matter was 50%.

*13: resin varnish containing 15% of ε-caprolactone ring-opening addition product and 50% of a nonvolatile matter, and having a hydroxyl value of 100 mgKOH/g, an acid value of 12 mgKOH/g and a number average molecular weight of 2,400, which was prepared by charging 600 parts of phthalic acid anhydride, 167 parts of trimethylol propane, 31 parts of adipic acid and 202 parts of ethylene glycol into a reaction vessel equipped with a stirrer, a thermometer, a device for removing water produced in the reaction and a introduction tube of nitrogen gas, and heating under stirring in the atmosphere of nitrogen gas until the temperature reached to 160° C., keeping the mixture to the temperature of 160° C. for 1 hour, increasing the temperature to 220° C. for 6 hours while removing produced condensed water to keep the temperature of 220° C., cooling the mixture to 100° C. at the time that the acid value became to 14 mgKOH/g, charging 500 parts of a mixture of xylene and isobutyl acetate (weight ratio: 90/10) and 163 parts of ε-caprolactone, heating the mixture to 140° C., keeping the same temperature for 15 hours, and diluting the mixture by adding a mixture of xylene and isobutyl acetate (weight ratio: 90/10) as the nonvolatile matter was 50%.

*14: DESMODURE N-75 (trade name, produced by BAYER Co., non-yellowing polyisocyanate compound (biuret compound of hexamethylene diisocyanate), 75% of nonvolatile matter, 16.6% of NCO group content).

15: SUPER BECKAMINE L-116-70 (trade name, produced by DAINIPPON INK Chemical Industries, LTD., melamine resin, 70% of nonvolatile matter).

*16: DURANATE MF-K60X (trade name, produced by Asahi Kasei Corporation, blocked isocyanate, 60% of nonvolatile matter, 6.6% of NCO group content).

*17: SANOL LS-292 (trade name, produced by SANKYO Co., hindered amine based antioxidant).

*18: TINUVIN 900 (trade name, produced by CHIBA SPECIALTY CHEMICALS INC., benzotriazole based ultraviolet absorbent).

*19: IRGACURE 184 (trade name, produced by CHIBA SPECIALTY CHEMICALS INC., acetophenone based polymerization initiator).

*20: SOLVESSO 100 (trade name, produced by EXXON Chemistry Co., aromatic solvent).

As definite from the results indicated in Tables 1 to 11, in Examples 1 to 13 of the ultraviolet-curable coating composition of the present invention, scratch resistance of the paint film is excellent and distinction of image, adhesion and gasoline resistance of the paint film are excellent. Further, when the ultraviolet-curable coating composition is applied on the article to be coated which the graphic tape is adhered, abnormality such as cracking and contraction is not observed.

Against, all of scratch resistance, distinction of image, adhesion, gasoline resistance and resistance of graphic tape test of the paint film can not be satisfied at the same time in Comparative Examples 1 to 30 which are not example of the present invention.

The ultraviolet-curable coating composition of the present invention can form the cured paint film having excellent scratch resistance and high degree of aesthetic decorative property, also excellent adhesion and gasoline resistance, and has high productivity of paint film.

The invention claimed is:

1. An ultraviolet-curable coating composition comprising:
   (A) an ultraviolet curable four or more functional groups-containing polyfunctional (meth)acrylate comprising four or more (meth)acryloyl groups in the molecule and a number average molecular weight of 300 to 2,000,
   (B) a lactone-modified polymer of polyhydric alcohol mono(meth)acrylate comprising 25 to 60 percent by weight of ε-caprolactone ring-opening addition product and having a hydroxyl value derived from the lactone modification of 100 to 180 mgKOH/g, and/or a lactone-modified polyester resin comprising 10 to 50 percent by weight of lactone ring-opening addition product and having a hydroxyl value of 50 to 180 mgKOH/g,
   (C) a non-yellowing polyisocyanate compound and/or an amino resin,
   (D) a light stabilizer, and
   (E) a photopolymerization initiator,
wherein the weight ratio of component (A) to the total weight of components (B) and (C) is 10:90 to 50:50, the weight ratio of component (B) to component (C) is 90:10 to 20:80, and the components described above are formulated to obtain a cured paint film having a Knoop hardness of 10 to 18 and a molecular weight of intercrosslinking of crosslinked resin component in the cured paint film of 150 to 300.

2. The ultraviolet-curable coating composition of claim 1, wherein component (B) is a lactone-modified polymer of polyhydric alcohol mono(meth)acrylate comprising 25 to 60 percent by weight of ε-caprolactone ring-opening addition product and having a hydroxyl value derived from the lactone modification of 100 to 180 mgKOH/g.

3. The ultraviolet-curable coating composition of claim 1, wherein component (B) is a lactone-modified polyester resin comprising 10 to 50 percent by weight of lactone ring-opening addition product and having a hydroxyl value of 50 to 180 mgKOH/g.

4. The ultraviolet-curable coating composition of claim 1, wherein component (C) is a non-yellowing polyisocyanate compound and the equivalent value of isocyanate group of component (C) to the hydroxyl group of ingredient (B) is from 0.5 to 1.5.

5. The ultraviolet-curable coating composition of claim 1, wherein component (C) is an amino resin.

6. A coated article obtained by applying the ultraviolet curable coating composition as claimed in claim 1.

7. The ultraviolet-curable coating composition of claim 1, wherein component (B) is a lactone-modified polymer of polyhydric alcohol mono(meth)acrylate comprising 25 to 60 percent by weight of ε-caprolactone ring-opening addition product and having a hydroxyl value derived from the lactone modification of 120 to 180 mgKOH/g.

8. The ultraviolet-curable coating composition of claim 2, wherein component (B) is a lactone-modified polymer of polyhydric alcohol mono(meth)acrylate comprising 25 to 60 percent by weight of ε-caprolactone ring-opening addition product and having a hydroxyl value derived from the lactone modification of 120 to 180 mgKOH/g.

9. The ultraviolet-curable coating composition of claim 1, wherein the components are formulated to obtain a cured paint film having a Knoop hardness of 11 to 18 and a molecular weight of intercrosslinking of crosslinked resin component in the cured paint film of 170 to 280.

10. The ultraviolet-curable coating composition of claim 2, wherein the components are formulated to obtain a cured paint film having a Knoop hardness of 11 to 18 and a molecular weight of intercrosslinking of crosslinked resin component in the cured paint film of 170 to 280.

* * * * *